US008718804B2

(12) United States Patent
Gao et al.

(10) Patent No.: US 8,718,804 B2
(45) Date of Patent: May 6, 2014

(54) SYSTEM AND METHOD FOR CORRECTING FOR LOST DATA IN A DIGITAL AUDIO SIGNAL

(75) Inventors: Yang Gao, Mission Viejo, CA (US); Herve Taddei, Munich (DE); Miao Lei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 994 days.

(21) Appl. No.: 12/773,668

(22) Filed: May 4, 2010

(65) Prior Publication Data

US 2010/0286805 A1 Nov. 11, 2010

Related U.S. Application Data

(60) Provisional application No. 61/175,463, filed on May 5, 2009.

(51) Int. Cl.
*G06F 17/00* (2006.01)
*G06F 11/00* (2006.01)
*H04B 15/00* (2006.01)

(52) U.S. Cl.
USPC .............................. 700/94; 714/747; 381/94.3

(58) Field of Classification Search
CPC ............................ G10L 19/005; G10L 19/083
USPC ................... 700/94; 714/747; 381/94.2, 94.3; 704/219, 223, 261, 262, 264, 266, 500, 704/501
See application file for complete search history.

(56) References Cited

U.S. PATENT DOCUMENTS

| | | | | |
|---|---|---|---|---|
| 2001/0028634 | A1 | 10/2001 | Huang et al. | |
| 2003/0139923 | A1* | 7/2003 | Wang et al. | 704/219 |
| 2004/0083093 | A1 | 4/2004 | Lee et al. | |
| 2008/0071530 | A1 | 3/2008 | Ehara | |
| 2008/0219344 | A1 | 9/2008 | Suzuki et al. | |
| 2009/0070117 | A1 | 3/2009 | Endo | |
| 2009/0119098 | A1 | 5/2009 | Zhan et al. | |

FOREIGN PATENT DOCUMENTS

| | | |
|---|---|---|
| CN | 1989548 | 6/2007 |
| CN | 101207459 | 6/2008 |
| CN | 1012619834 | 9/2008 |
| WO | WO 01/54116 | 7/2001 |

OTHER PUBLICATIONS

International Search Report and Written Opinion, PCT/CN2010/072451, Huawei Technologies Co., Ltd., et al., mail date: Jul. 29, 2010, 14 pages.

"Series G: Transmission Systems and Media, Digital Systems and Networks," Digital terminal equipments-Coding of analogue signals by methods other than PCM, G.729-based embedded variable bit-rate coder: An 8-32 kbit/s scalable wideband coder bitstream interoperable with G.729, ITU-T G.729.1 Telecommunication Standardization Sector of ITU, May 2006, 100 pages.

* cited by examiner

*Primary Examiner* — Jesse Elbin
(74) *Attorney, Agent, or Firm* — Slater and Matsil, L.L.P.

(57) ABSTRACT

In an embodiment, a method of receiving a digital audio signal, using a processor, includes correcting the digital audio signal from lost data. Correcting includes copying frequency domain coefficients of the digital audio signal from a previous frame, adaptively adding random noise coefficients to the copied frequency domain coefficients, and scaling the random noise coefficients and the copied frequency domain coefficients to form recovered frequency domain coefficients. Scaling is controlled with a parameter representing a periodicity or harmonicity of the digital audio signal. A corrected audio signal is produced from the recovered frequency domain coefficients.

20 Claims, 7 Drawing Sheets

SYSTEM AND METHOD FOR CORRECTING FOR LOST DATA IN A DIGITAL AUDIO SIGNAL

This patent application claims priority to U.S. Provisional Application No. 61/175,463 filed on May 5, 2009, entitled "Low Complexity FEC Algorithm for MDCT Based Codec," which application is incorporated by reference herein.

TECHNICAL FIELD

The present invention relates generally to audio signal coding or compression, and more particularly to a system and method for correcting for lost data in a digital audio signal.

BACKGROUND

In modern audio/speech digital signal communication systems, a digital signal is compressed at an encoder and the compressed information is packetized and sent to a decoder through a communication channel, frame by frame, in real time. A system made of an encoder and decoder together is called a CODEC.

Most communication channels can not guarantee that all information packets sent by encoder reaches decoder side in real time without any loss of data, or without the data being delayed to the point where it becomes unusable. Generally, the packet loss rate varies according to the channel quality. In order to compensate for loss of sound quality due to the packet loss, some audio decoders implement a Frame Erasure Concealment (FEC) algorithm, also known as a Packet Loss Concealment (PLC) algorithm. Different types of decoders usually employ different FEC algorithms.

G.729.1 is a scalable codec having multiple layers working at different bit rates. The lowest core layers of 8 kbps and 12 kbps implement a Code-Excited Linear Prediction (CELP) algorithm. These two core layers encode and decode a narrowband signal from 0 to 4 kHz. At the bit rate of 14 kbps, a Band-Width Extension (BWE) algorithm called a Time Domain Band-Width Extension (TDBWE) encodes/decodes a high band from 4 kHz to 7 kHz by using an extra 2 kbps added to the 12 kbps bit rate to enhance audio quality. BWE usually includes frequency and time envelope coding and fine spectral structure generation. Since both frequency and time envelope coding may take most of the bit budget, fine spectral structure is often generated by spending very little or no bit budget. The corresponding signal in time domain of the fine spectral structure is called excitation. The frequency domain can be defined in a Modified Discrete Cosine Transform (MDCT), a Fast-Fourier Transform (FFT) domain, or other domain. The TDBWE algorithm in G.729.1 is a BWE that generates an excitation signal in the time domain and applies temporal shaping on the excitation signal. The time domain excitation signal is then transformed into the frequency domain with an FFT transformation, and the spectral envelope is applied in FFT domain.

In the ITU G.729.1 standard, which is incorporated herein by reference, at a 16 kbps layer or greater layers, the high frequency band from 4 kHz to 7 kHz is encoded/decoded with an MDCT algorithm when no information (bitstream packets) is lost in the channel. When packet loss occurs, however, the FEC algorithm is based on a TDBWE algorithm.

ITU-T Rec. G.729.1 is also called G.729EV, which is an 8-32 kbit/s scalable wideband (50-7000 Hz) extension of ITU-T Rec. G.729. By default, the encoder input and decoder output are sampled at 16 kHz. The bitstream produced by the encoder is scalable and has 12 embedded layers, which will be referred to as Layers 1 to 12. Layer 1 is the core layer corresponding to a bit rate of 8 kbit/s. This layer is compliant with a G.729 bitstream, which makes G.729EV interoperable with G.729. Layer 2 is a narrowband enhancement layer adding 4 kbit/s, while Layers 3 to 12 are wideband enhancement layers adding 20 kbit/s with steps of 2 kbit/s.

A G.729EV coder operates with a digital signal sampled at 16 kHz in a 16-bit linear pulse code modulated (PCM) format as an encoder input. However, an 8 kHz input sampling frequency is also supported. Similarly, the format of the decoder output is 16-bit linear PCM with a sampling frequency of 8 or 16 kHz. Other input/output characteristics are converted to 16-bit linear PCM with 8 or 16 kHz sampling before encoding, or from 16-bit linear PCM to the appropriate format after decoding.

The G.729EV coder is built upon a three-stage structure using embedded CELP coding, TDBWE, and predictive transform coding that will be referred to as Time-Domain Aliasing Cancellation (TDAC). A TDAC algorithm can be viewed as specific type of MDCT algorithm. The embedded CELP stage generates Layers 1 and 2 that yield a narrowband synthesis (50-4000 Hz) at 8 kbit/s and 12 kbit/s. The TDBWE stage generates Layer 3 and allows the production of a wideband output (50-7000 Hz) at 14 kbit/s. The TDAC stage operates in the MDCT domain and generates Layers 4 to 12 to improve quality from 16 to 32 kbit/s. The TDAC module jointly encodes the weighted CELP coding error signal in the 50-4000 Hz band and the input signal in the 4000-7000 Hz band for Layers 4 to 12. The FEC algorithm for Layers 4 to 12, however, is still based on the TDBWE algorithm.

The G.729EV coder operates using 20 ms frames. However, the embedded CELP coding stage operates on 10 ms frames, like G.729. As a result two 10 ms CELP frames are processed per 20 ms frame. To be consistent with the text of ITU-T Rec. G.729, which is incorporated herein by reference, the 20 ms frames used by G.729EV will be referred to as superframes, whereas the 10 ms frames and the 5 ms subframes involved in the CELP processing will be respectively called frames and subframes.

As illustrated in FIG. 1, the TDBWE (Layer 3) encoder extracts a fairly coarse parametric description from the pre-processed and downsampled higher-band signal 101, $s_{HB}(n)$. This parametric description includes time envelope 102 and frequency envelope 103 parameters. The 20 ms input speech superframe 101, $s_{HB}(n)$ is subdivided into 16 segments of length 1.25 ms each, i.e., where each segment has 10 samples. The 16 time envelope parameters 102, $T_{env}(i)$, i=0, . . . , 15, are computed as logarithmic subframe energies:

$$T_{env}(i) = \frac{1}{2}\log_2\left(1/10\sum_{n=0}^{9} S_{HB}^2(n+i\cdot 10)\right), \; i=0, \ldots, 15. \tag{1}$$

TDBWE parameters $T_{env}(i)$, i=0, . . . , 15, are quantized by mean-removed split vector quantization. First, mean time envelope 104 is calculated:

$$M_T = \frac{1}{16}\sum_{i=0}^{15} T_{env}(i). \tag{2}$$

The mean value 104, $M_T$, is then scalar quantized with 5 bits using uniform 3 dB steps in log domain. This quantization produces the quantized value 105, $\hat{M}_T$. The quantized mean is then subtracted:

$$T_{env}^{M}(i)=T_{env}(i)-\hat{M}_T,\; i=0, \ldots, 15. \tag{3}$$

The mean-removed time envelope parameter set is then split into two vectors of dimension 8:

$$T_{env,1}=(T_{env}^{M}(0),T_{env}^{M}(1)_{1},\ldots,T_{env}^{M}(7)) \text{ and } T_{env,2}=(T_{env}^{M}(8),T_{env}^{M}(9),\ldots,T_{env}^{M}(15)). \quad (4)$$

Finally, vector quantization using pre-trained quantization tables is applied. Note that the vectors $T_{env,1}$ and $T_{env,2}$ share the same vector quantization codebooks to reduce storage requirements. The codebooks (or quantization tables) for $T_{env,1}/T_{env,2}$ are generated by modifying generalized Lloyd-Max centroids such that a minimal distance between two centroids is verified. The codebook modification procedure includes rounding Lloyd-Max centroids on a rectangular grid with a step size of 6 dB in log domain.

For the computation of the 12 frequency envelope parameters 103, $F_{env}(j)$ j=0, . . . , 11, the signal 101, $s_{HB}(n)$, is windowed by a slightly asymmetric analysis window $w_F(n)$. The maximum of the window $w_F$ (n) is centered on the second 10 ms frame of the current superframe. The window $w_F$ (n) is constructed such that the frequency envelope computation has a lookahead of 16 samples (2 ms) and a lookback of 32 samples (4 ms). The windowed signal $s_{HB}^{w}(n)$ is transformed by FFT. Finally, the frequency envelope parameter set is calculated as logarithmic weighted sub-band energies for 12 evenly spaced and equally wide overlapping sub-bands in the FFT domain. The j-th sub-band starts at the FFT bin of index 2j and spans a bandwidth of 3 FFT bins.

FIG. 2 illustrates the concept of the TDBWE decoder module. The TDBWE received parameters are used to shape artificially generated excitation signal 202, $\hat{s}_{HB}^{exc}(n)$, according to desired time and frequency envelopes 209, $\hat{T}_{env}(i)$, and 209, $\hat{F}_{env}(j)$. This shaping is followed by a time-domain post-processing procedure.

The quantized parameter set includes the value $\hat{M}_T$ and the following vectors: $\hat{T}_{env,1}$, $\hat{T}_{env,2}$, $\hat{F}_{env,1}$, $\hat{F}_{env,2}$ and $\hat{F}_{env,3}$. The split vectors are defined by Equations (4). The quantized mean time envelope $\hat{M}_T$ is used to reconstruct the time envelope and the frequency envelope parameters from the individual vector components, i.e.:

$$\hat{T}_{env}(i)=\hat{T}_{env}^{M}(i)+\hat{M}_T,\ i=0,\ldots,15 \quad (5)$$

and $$\hat{F}_{env}(j)=\hat{F}_{env}^{M}(j)+\hat{M}_T,\ j=0,\ldots,11 \quad (6)$$

TDBWE excitation signal 201, exc(n), is generated by a 5 ms subframe based on parameters that are transmitted in Layers 1 and 2 of the bitstream. Specifically, the following parameters are used: the integer pitch lag $T_0$=int($T_1$) or int ($T_2$) depending on the subframe, the fractional pitch lag frac, the energy of the fixed codebook contributions $$E_c = \sum_{n=0}^{39} (\hat{g}_c \cdot c(n) + \hat{g}_{enh} \cdot c'(n))^2,$$

and the energy of the adaptive codebook contribution $$E_p = \sum_{n=0}^{39} (\hat{g}_p \cdot v(n))^2.$$

The parameters of the excitation generation are computed for every 5 ms subframe. The excitation signal generation includes the following steps:

- estimation of two gains $g_v$ and $g_{uv}$ for the voiced and unvoiced contributions to the final excitation signal 201, exc(n);
- pitch lag post-processing;
- generation of the voiced contribution;
- generation of the unvoiced contribution; and
- low-pass filtering.

The shaping of the time envelope of the excitation signal 202, $s_{HB}^{exc}(n)$ utilizes decoded time envelope parameters 208, $\hat{T}_{env}(i)$, with i=0, . . . , 15 to obtain a signal 203, $\hat{s}_{HB}^{T}(n)$, with a time envelope that is nearly identical to the time envelope of the encoder side higher-band signal 101, $s_{HB}(n)$. This is achieved by scalar multiplication:

$$\hat{s}_{HB}^{T}(n)=g_T(n)\cdot s_{HB}^{exc}(n),\ n=0,\ldots,159. \quad (7)$$

In order to determine the gain function $g_T(n)$, the excitation signal 202, $s_{HB}^{exc}(n)$, is segmented and analyzed in the same manner as the parameter extraction in the encoder. The obtained analysis results are, again, time envelope parameters $\tilde{T}_{env}(i)$ with i=0, . . . , 15. They describe the observed time envelope of $s_{HB}^{exc}(n)$. Then a preliminary gain factor is calculated:

$$g'_T(i) = 2^{\hat{T}_{env}(i)-\tilde{T}_{env}(i)},\ i = 0, \ldots , 15 \quad (8)$$

For each signal segment with index i=0, . . . , 15, these gain factors are interpolated using a "flat-top" Hanning window $w_t(\ )$. This interpolation procedure finally yields the gain function:

$$g_T(n+i\cdot 10) = \begin{cases} w_t(n)\cdot g'_T(i) + w_t(n+10)\cdot g'_T(i-1) & n = 0, \ldots , 4 \\ w_t(n)\cdot g'_T(i) & n = 5, \ldots , 9, \end{cases} \quad (9)$$

where $g'_T(-1)$ is defined as the memorized gain factor $g'_T(15)$ from the last 1.25 ms segment of the preceding superframe.

Signal 204, $\hat{s}_{HB}^{F}(n)$, is obtained by shaping the excitation signal $s_{HB}^{exc}(n)$ (generated from parameters estimated in lower-band by the CELP decoder) according to the desired time and frequency envelopes. Generally, there is no coupling between this excitation and the related envelope shapes $\hat{T}_{env}$ (i) and $\hat{F}_{env}(j)$. As a result, some clicks may be present in the signal $\hat{s}_{HB}^{F}(n)$. To attenuate these artifacts, an adaptive amplitude compression is applied to $\hat{s}_{HB}^{F}$. Each sample of $\hat{s}_{HB}^{F}(n)$ of the i-th 1.25 ms segment is compared to the decoded time envelope $\hat{T}_{env}(i)$ and the amplitude of $\hat{s}_{HB}^{F}(n)$ are compressed in order to attenuate large deviations from this envelope. The TDBWE synthesis 205, $\hat{s}_{HB}^{bwe}(n)$ is transformed to $\hat{S}_{HB}^{bwe}$ (k) by MDCT. This spectrum is used by the TDAC decoder to extrapolate missing sub-bands.

In case of packet loss, the G.729.1 decoder employs the TDBWE algorithm to compensate for the HB part by estimating the current spectral envelope and the temporal envelope using information from the previous frame. The excitation signal is still constructed by extracting information from the low band (Narrowband) CELP parameters. As can be seen from the above description, such an FEC process is quite complicated.

As mentioned above, G.729.1 employs a TDAC/MDCT based codec algorithm to encode and decode the high band part for bit-rate higher than 14 kbps. The TDAC encoder illustrated in FIG. 3 jointly represents jointly two split MDCT spectra 301, $D_{LB}^{w}(k)$, and 302, $S_{HB}(k)$, by gain-shape vector quantization. Joint spectrum 303, Y(k), is divided into sub-bands, where each sub-band defines the spectral envelope. The sub-bands are represented in the log domain by 304, log_rms(j). After quantization, the spectral envelope is represented by the index 305, rms_index (j). The spectral envelope information is also used to allocate a proper number of bits 306, nbit(j), for each subband to code the MDCT coefficients. The shape of each sub-band coefficients is encoded by embedded spherical vector quantization using trained permutation codes.

Lower-band CELP weighted error signal $d_{LB}^{w}(n)$ and higher-band signal $s_{HB}(n)$ are transformed into frequency domain by MDCT with a superframe length of 20 ms and a window length of 40 ms. $D_{LB}^{w}(k)$ represents the MDCT coefficients of the windowed signal $d_{LB}^{w}(n)$ with 40 ms sinusoidal windowing. MDCT coefficients, Y(k), in the 0-7000 Hz band are split into 18 sub-bands. The j-th sub-band comprises nb_coef(j) coefficients Y(k) with sb_bound (j)≤k<sb_bound (j+1). Each subband of the first 17 sub-bands includes 16 coefficients (400 Hz bandwidth), and the last sub-band includes 8 coefficients (200 Hz bandwidth). The spectral envelope is defined as the root mean square (rms) in log domain of the 18 sub-bands, which is then quantized in encoder.

The perceptual importance 307, ip(j),j=0 . . . 17, of each sub-band is defined as:

$$ip(j) = \frac{1}{2}\log_2(\text{rms\_q}(j)^2 \times \text{nb\_coef}(j)) + \text{offset}, \quad (10)$$

where $\text{rms\_q}(j)=2^{1/2\ \text{rms\_index}(j)}$ is the quantized rms and $\text{rms\_q}(j)^2 \times \text{nb\_coef}(j)$ corresponds to the quantized sub-band energy. Consequently the perceptual importance is equivalent to the sub-band log-energy. This information is related to the quantized spectral envelope as follows:

$$ip(j) = \frac{1}{2}[\text{rms\_index}(j) + \log_2(\text{nb\_coef}(j))] + \text{offset}. \quad (11)$$

The offset value is introduced to simplify further the expression of ip(j). The sub-bands are then sorted by decreasing perceptual importance. This perceptual importance ordering is used for bit allocation and multiplexing of vector quantization indices.

Each sub-band j=0, . . . , 17 of dimension nb_coef(j) is encoded with nbit(j) bits by spherical vector quantization. This operation is divided into two steps: search for a best code vector and indexing of the selected code vector.

The bits associated with the HB spectral envelope coding are multiplexed before the bits associated with the lower-band spectral envelope coding. Furthermore, sub-band quantization indices are multiplexed by order of decreasing perceptual importance. The sub-bands that are perceptually more important (i.e., with the largest perceptual importance ip(j)) are written first in the bitstream. As a result, if just part of the coded spectral envelope is received at the decoder, the higher-band envelope can be decoded before that of the lower band. This property is used at the TDAC decoder to perform a partial level-adjustment of the higher-band MDCT spectrum.

The TDAC decoder pertaining to layers 4 to 12 is depicted in FIG. 4. Received normalization factor (called norm_MDCT) transmitted by the encoder with 4 bits is used in the TDAC decoder to normalize MDCT coefficients 401, $\hat{Y}^{norm}(k)$. The factor is used to scale the signal reconstructed by two inverse MDCTs. The higher-band spectral envelope 407, rms_q(j), is decoded first, then index rms_index(j), j=11, . . . , 17, is reconstructed. If the number of bits is insufficient to decode the higher-band spectral envelope completely, decoded indices rms_index(j) are kept to allow partial level-adjustment of the decoded HB spectrum. The bits related to the lower band, i.e. rms_index(j), j=0, . . . , 9, are decoded in a similar way as in the higher band. The decoded indices are combined into a single vector [rms_index(0)rms_index(1) . . . rms_index(17)], which represents the reconstructed spectral envelope in log domain. The vector quantization indices are read from the TDAC bitstream according to their perceptual importance ip(j).

In sub-band j of dimension nb_coef(j) and non-zero bit allocation nbit(j), the vector quantization index identifies a code vector which constructs the sub-band j of $\hat{Y}^{norm}(k)$ The missing subbands are filled by the generated coefficients 408 from the transform of the TDBWE signal. After filling the missing subbands, the complete set of MDCT coefficients are named as 402, $\hat{Y}^{ext}(k)$, which will be subject to level adjustment by using the spectral envelope information. Level-adjusted coefficients 403, $\hat{Y}(k)$, are the input to the post-processing module. The post-processing of MDCT coefficients is only applied to the higher band, because the lower band is post-processed with a traditional time-domain approach. For the high-band, there are no Linear Prediction Coding (LPC) coefficients transmitted to the decoder. The TDAC post-processing is performed on the available MDCT coefficients at the decoder side. Reconstructed spectrum 404, $\hat{Y}^{post}(k)$, is split into a lower-band spectrum 406, $\hat{D}_{LB}^{w}(k)$, and a higher-band spectrum 405, $\hat{S}_{HB}(k)$. Both bands are transformed to the time domain using inverse MDCT transforms.

Narrowband (NB) signal encoding is mainly contributed by the CELP algorithm, and its concealment strategy is disclosed the ITU G7.29.1 standard. Here, the concealment strategy includes replacing the parameters of the erased frame based on the parameters from past frames and the transmitted extra FEC parameters. Erased frames are synthesized while controlling the energy. This concealment strategy depends on the class of the erased superframe, and makes use of other transmitted parameters that include phase information and gain information.

SUMMARY OF THE INVENTION

In an embodiment, a method of receiving a digital audio signal, using a processor, includes correcting the digital audio signal from lost data. Correcting includes copying frequency domain coefficients of the digital audio signal from a previous frame, adaptively adding random noise coefficients to the copied frequency domain coefficients, and scaling the random noise coefficients and the copied frequency domain coefficients to form recovered frequency domain coefficients. Scaling is controlled with a parameter representing a periodicity or harmonicity of the digital audio signal.

In another embodiment, a method of receiving a digital audio signal using a processor, includes generating a high band time domain signal, generating low band time domain signal, estimating an energy ratio between the high band and the low band from a last good frame, keeping the energy ratio for following frame-erased frames by applying an energy correction scaling gain to a high band signal segment by segment in the time domain, combining the low band signal and the high band signal into a final output.

In a further embodiment, a method of correcting for missing audio data includes copying frequency domain coefficients of the digital audio signal from a previous frame, adaptively adding random noise coefficients to the copied frequency domain coefficients, scaling the random noise coefficients and the copied frequency domain coefficients to form recovered frequency domain coefficients. Scaling is controlled with a parameter representing a periodicity or harmonicity of the digital audio signal. The method also includes generating a high band time domain signal by inverse-transforming high band frequency domain coefficients of the recovered frequency domain coefficients, generating low band time domain signal and estimating an energy ratio between the high band and the low band from a last good frame. The method further includes keeping the energy ratio for following frame-erased frames by applying an energy correction scaling gain to a high band signal, segment by segment in the time domain and combining the low band signal and the high band signal to form a final output.

In a further embodiment, a system for receiving a digital audio signal includes an audio decoder configured to copy frequency domain coefficients of the digital audio signal from a previous frame, adaptively add random noise coefficients to the copied coefficients, and scale the random noise coefficients and the copied frequency domain coefficients to form recovered frequency domain coefficients. In an embodiment, scaling is controlled with a parameter representing a periodicity or harmonicity of the digital audio signal. The audio decoder is also configured to produce a corrected audio signal from the recovered frequency domain coefficients.

The foregoing has outlined, rather broadly, features of the present invention. Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Figure 1:
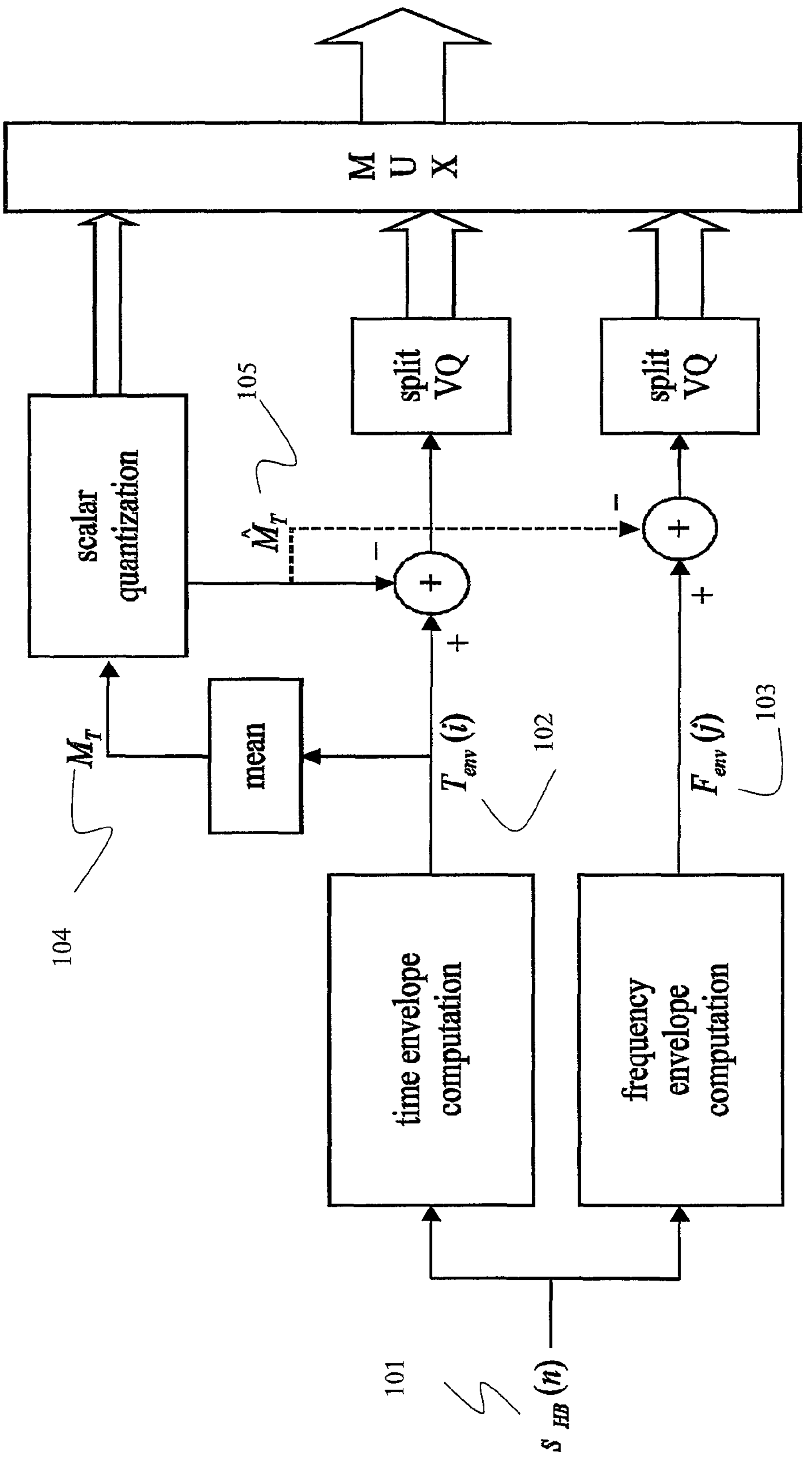
Prior Art FIG. 1
FIG. 1 illustrates a high-level block diagram of a G.729.1 TDBWE encoder.
Figure 2:
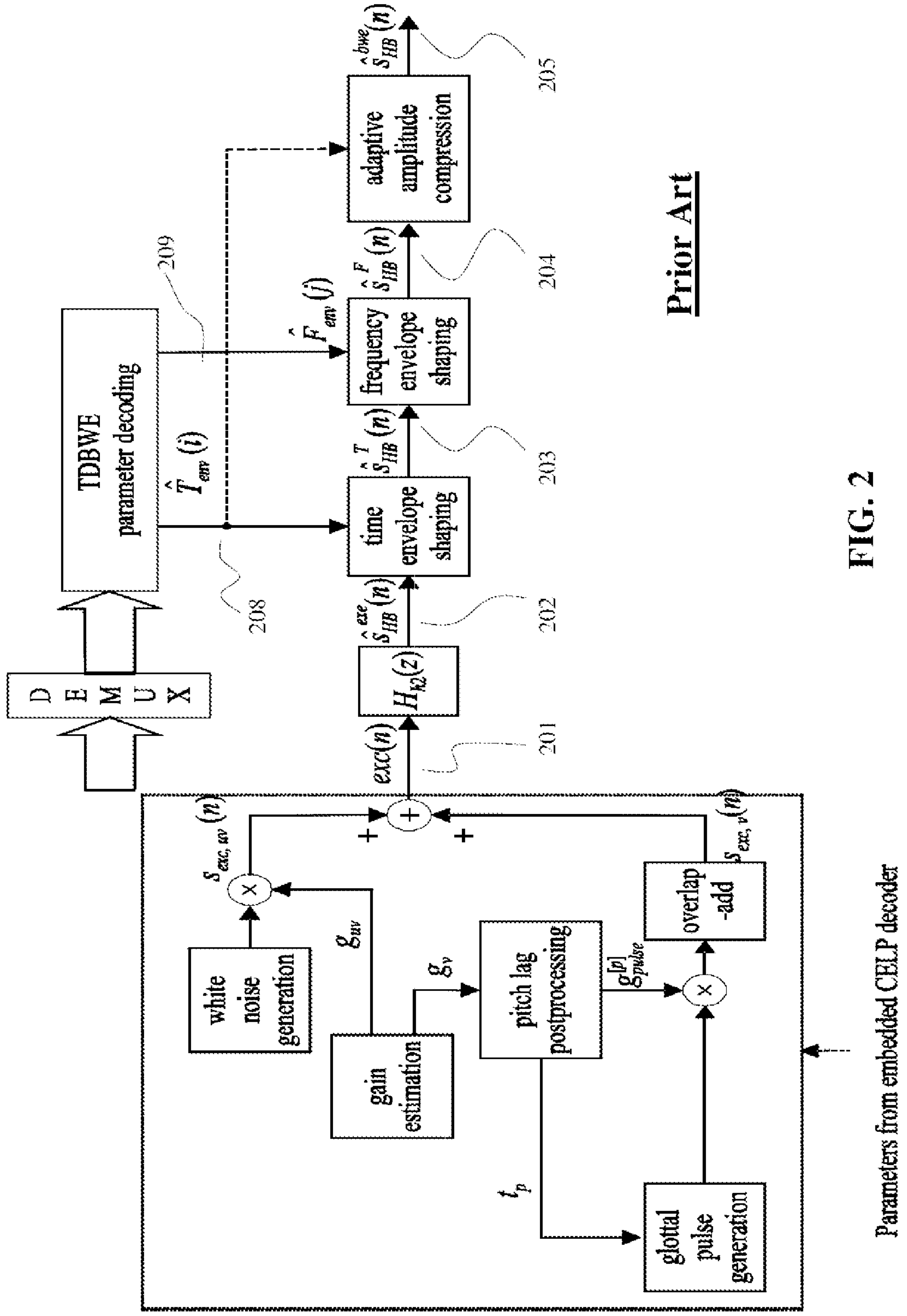
Prior Art FIG. 2
FIG. 2 illustrates high-level block diagram of a G.729.1 TDBWE decoder.
Figure 3:
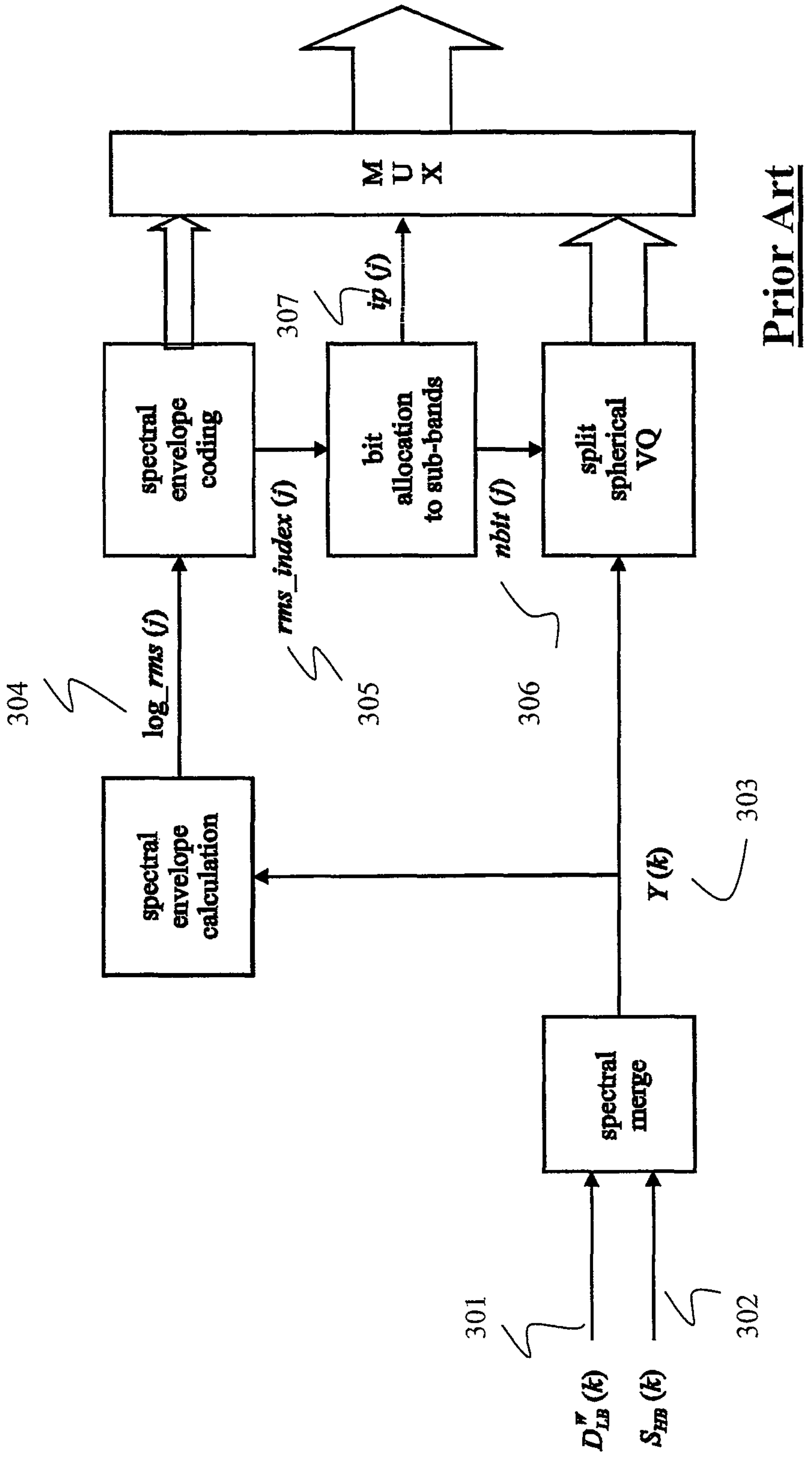
FIG. 3 illustrates a high-level block diagram of a G.729.1 TDAC encoder.
Figure 4:
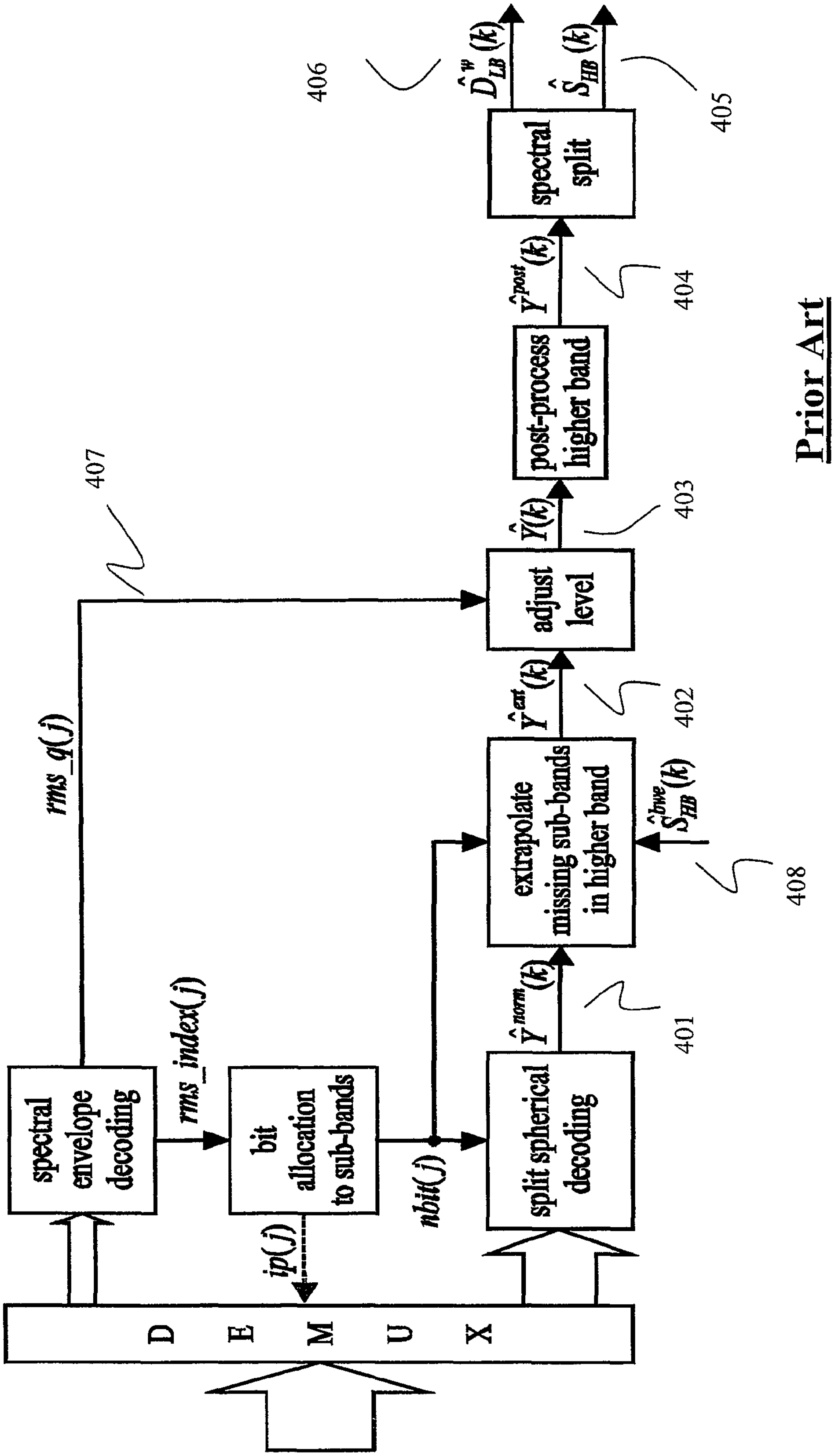
Prior Art FIG.4
FIG. 4 illustrates high-level block diagram of a G.729.1 TDAC decoder.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely a system and method for performing audio decoding for telecommunication systems. Embodiments of this invention may also be applied to systems and methods that utilize speech and audio transform coding.

In an embodiment, a FEC algorithm generates current MDCT coefficients by combining old MDCT coefficients from previous frame with adaptively added random noise. The copied MDCT component from a previous frame and the added noise component are adaptively scaled by using scaling factors which are controlled with a parameter representing periodicity or harmonicity of signal. In the time domain, the high band signal is obtained by an inverse MDCT transformation of the generated MDCT coefficients, and is adaptively scaled segment by segment while maintaining the energy ratio between the high band and low band signals.

In the G.729.1 standard, even though the output signal may be sampled at a 16 kHz sampling rate, the bandwidth is limited to 7 kHz, and the energy from 7 kHz to 8 kHz is set to zero. Recently, the ITU-T has standardized a scalable extension of G.729.1 (having G.729.1 as core), called here G.729.1 super-wideband extension. The extended standard encodes/decodes a superwideband signal between 50 Hz and 14 kHz with a sampling rate of 32 kHz for the input/output signal. In this case, the superwideband spectrum is divided into 3 bands. The first band from 0 to 4 kHz is called the Narrow Band (NB or low band, the second band from 4 kHz to 7 kHz is called the Wide Band (WB) or high band (HB), and the spectrum above 7 kHz is called the superwideband (SWB) or super high band. The definitions of these names may vary from application to application. Typically, FEC algorithms for each band are different. Without losing the generality, the example embodiments are directed toward the second band (WB)—high band area. Alternatively, embodiment algorithms can be directed toward the first band, third band, or toward other systems.

This section describes an embodiment modification of FEC in the 4 kHz-7 kHz band for G.729.1 when the output sampling rate is at 32 kHz. As mentioned hereinabove, one of the functions of TDBWE algorithm in G.729.1 is to perform frame erasure concealment (FEC) of the high band (4 kHz-7 kHz) not only for the 14 kbps layer, but also for higher layers, although the layers higher than 14 kbps are coded with a MDCT based codec algorithm in a no-FEC condition. Some embodiment algorithms exploit the characteristics of MDCT based codec algorithm to achieve a simpler FEC algorithm for those layers higher than 14 kbps. Some embodiment FEC algorithms re-generates non received MDCT coefficients of a given frame by using the MDCT coefficients of the previous frame to which some random coefficients are added in an adaptive fashion. In time domain, the signal obtained by applying an inverse MDCT transform of the generated MDCT coefficients is adaptively scaled, segment by segment, while maintaining the energy ratio between the high band and low band signals.

Some embodiment FEC algorithms generate MDCT domain coefficients and correct temporal energy shape of the signal in time domain in case of packet loss. In other embodiments, the generation of MDCT coefficients and the correction of the signal time domain shape can work separately. For example, in one embodiment, the correction of signal time domain shape is applied to a signal that is not generated using embodiment algorithms. Further more, in other embodiments, the generation of MDCT coefficients works independently on any frequency band without considering the relationship with other frequency bands.

The TDBWE in G.729.1 has three functions: (1) producing the layer of 14 kbps; (2) filling 0 bit subbands; and (3) performing FEC for rates>=16 kbps. Some embodiments of the current invention are adapted to replace the third function of the TDBWE in the G.729.1 standard for super-wideband extension for rates greater than or equal to 32 kbps at a sampling rate of 32 kHz. In some embodiments, under the of rates greater than or equal to 32 kbps at a sampling rate of 32 kHz, the layer of 14 kbps is not used, and the second function of TDBWE is replaced with a simpler embodiment algorithm, and the third function of TDBWE is also replaced with an embodiment algorithm. The FEC algorithm of the high band of 4 kHz to 7 kHz for rates greater than or equal to 32 kbps at the sampling rate of 32 kHz exploits the characteristics of the MDCT based codec algorithm.

Figure 5:
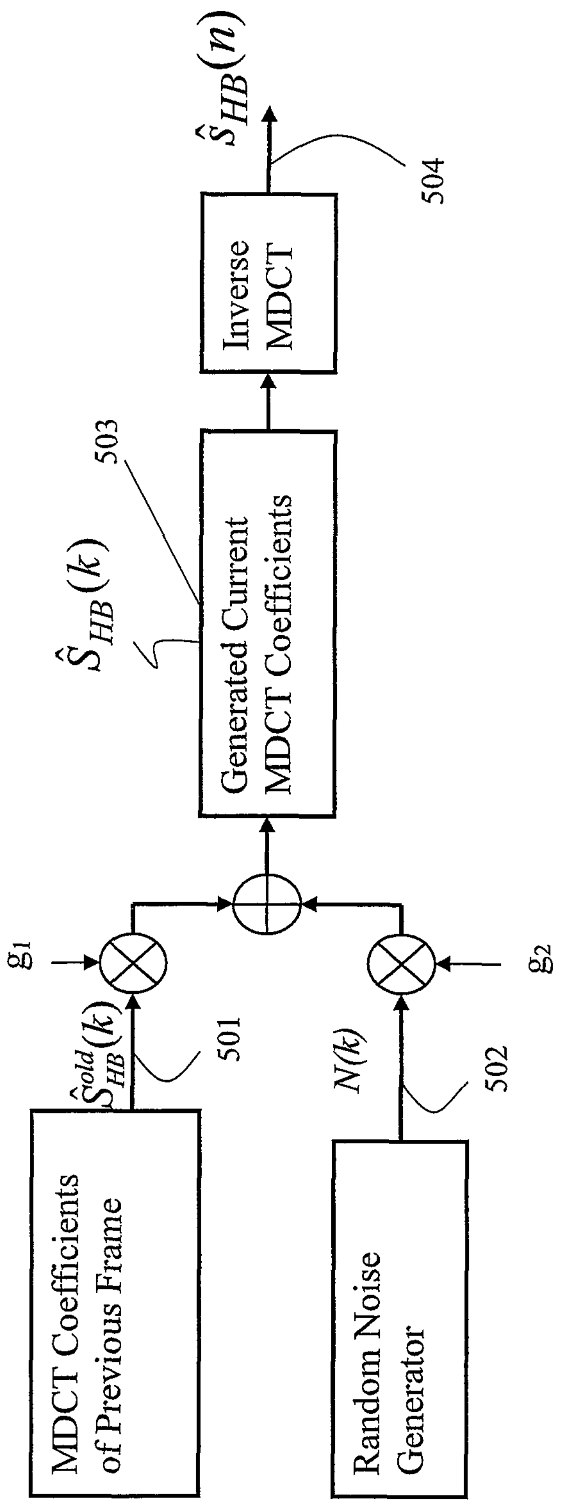
FIG. 5 illustrates an embodiment FEC algorithm in the frequency domain.

In an embodiment, a FEC algorithm has two main functions: generating MDCT domain coefficients and correcting the temporal energy shape of the high band signal in the time domain, in case of packet loss. The details of the two main functions are described as follows:

With respect to the estimation of MDCT domain coefficients in the case of packet loss, a simple solution is to copy the MDCT domain coefficients from previous frame to current frame. However, such a simple repetition of previous MDCT coefficients may cause unnatural sound or too much periodicity (too high harmonicity) in some situations. In an embodiment, in order to control the signal periodicity and the sound naturalness, random noise components are adaptively added to the copied MDCT coefficients (see FIG. 5):

$$\hat{S}_{HB}(k)=g_1\cdot\hat{S}_{HB}^{old}(k)+g_2\cdot N(k), \tag{12}$$

where $\hat{S}_{HB}^{old}(k)$ are copied MDCT coefficients 501 of the high band [4-7 kHz] from previous frame, and all the MDCT coefficients in the 7 kHz to 8 kHz band are set to zero in terms of the codec definition; N(k) are random noise coefficients 502, the energy of which is initially normalized to $\hat{S}_{HB}^{old}(k)$ in each subband. In an embodiment, every 20 MDCT coefficients are defined as one subband, resulting in 8 subbands from 4 kHz to 8 kHz. The last 2 subbands of the 7 kHz to 8 kHz band are set to zero. In alternative embodiments, more than or less than 20 MDCT coefficients can be defines as a subband. In Equation (12), g1 and $g_2$ are two gains estimated to control the energy ratio between $\hat{S}_{HB}^{old}(k)$ and N(k) while maintaining an appropriate total energy reduction compared to the previous frame during the FEC. If $\overline{G}_p$, $0\le\overline{G}_p\le 1$ is a parameter defined to measure the signal periodicity, $\overline{G}_p=0$ means no periodicity and $\overline{G}_p=1$ represents full periodicity; g1 and $g_2$ are defined as follows:

$$g_1=g_r\cdot\overline{G}_p;\text{and} \tag{13}$$

$$g_2=g_r\cdot(1-\overline{G}_p). \tag{14}$$

Here, $g_r=0.9$ is a gain reduction factor in MDCT domain to maintain the energy of current frame lower than the one of previous frame. In alternative embodiments $g_r$ can take on other values. In some embodiments, aggressive energy control is not applied at this stage and the temporal energy shape is corrected later in the time domain. $\overline{G}_p$ is the last smoothed voicing factor which is expressed as $\overline{G}_p \Leftarrow 0.75\,\overline{G}_p+0.25\,G_p$ from one received subframe to next received subframe. In some embodiments, $\overline{G}_P$ is expressed generally as $\overline{G}_p \Leftarrow \beta\,\overline{G}_p+(1-\beta)G_p$, where β is between 0 and 1. $G_p$ is based on the received subframe and expressed as:

$$G_p=\frac{E_p}{E_p+E_c} \tag{15}$$

During FEC frames, $\overline{G}_p$ is reduced by a factor 0.75 from current to next frame: $\overline{G}_p \Leftarrow 0.75\,\overline{G}_p$ so that the periodicity keeps decreasing when more consecutive FEC frames occur in embodiments. In alternative embodiments, $\overline{G}_p$ is reduced by a factor other than 0.75. In equation (15), $E_p$ is the energy of the adaptive codebook excitation component and $E_c$ is the energy of the fixed codebook excitation component.

In an embodiment, another way of estimating the periodicity is to define a pitch gain or a normalized pitch gain:

$$g_p=\frac{\sum_n \hat{s}(n)\cdot\hat{s}(n+T)}{\sqrt{\left[\sum_n \hat{s}(n)\cdot\hat{s}(n)\right]\left[\sum_n \hat{s}(n+T)\cdot\hat{s}(n+T)\right]}}, \tag{16}$$

where T is a pitch lag from last received frame for CELP algorithm, ŝ(n) is time domain signal which sometimes could be defined in weighted signal domain or LPC residual domain, and $g_p$ is used to replace $G_p$.

In the case of music signals that have no available CELP parameters, a frequency domain harmonic measure or a spectral sharpness measure is used as a parameter to replace $\overline{G}_p$ in equations (13) and (14) in some embodiments. For example, the spectral sharpness for one subband can be defined as the average magnitude divided by the maximum magnitude:

$$\text{Sharp}=\frac{\frac{1}{N}\sum_k \left|\hat{S}_{HB}(k)\right|}{\text{Max}\{\left|\hat{S}_{HB}(k)\right|,\ k=0,1,\ldots,N\}}. \tag{17}$$

Based on the definition in equations (17), a smaller value of Sharp means a sharper spectrum or more harmonics in the spectral domain. In most cases, however, a higher harmonic spectrum also means a higher periodic signal. In an embodiment, the parameter of equation (17) is mapped to another parameter varying from 0 to 1 before replacing $\overline{G}_p$.

In an embodiment, after the generated MDCT coefficients 503, $\hat{S}_{HB}(k)$, are determined, they are inverse-transformed into the time domain. During the inverse transformation, the contribution under current MDCT window is interpolated with the one from a previous MDCT window to get the estimated high band signal 504, $\hat{s}_{HB}(n)$.

Figure 6:
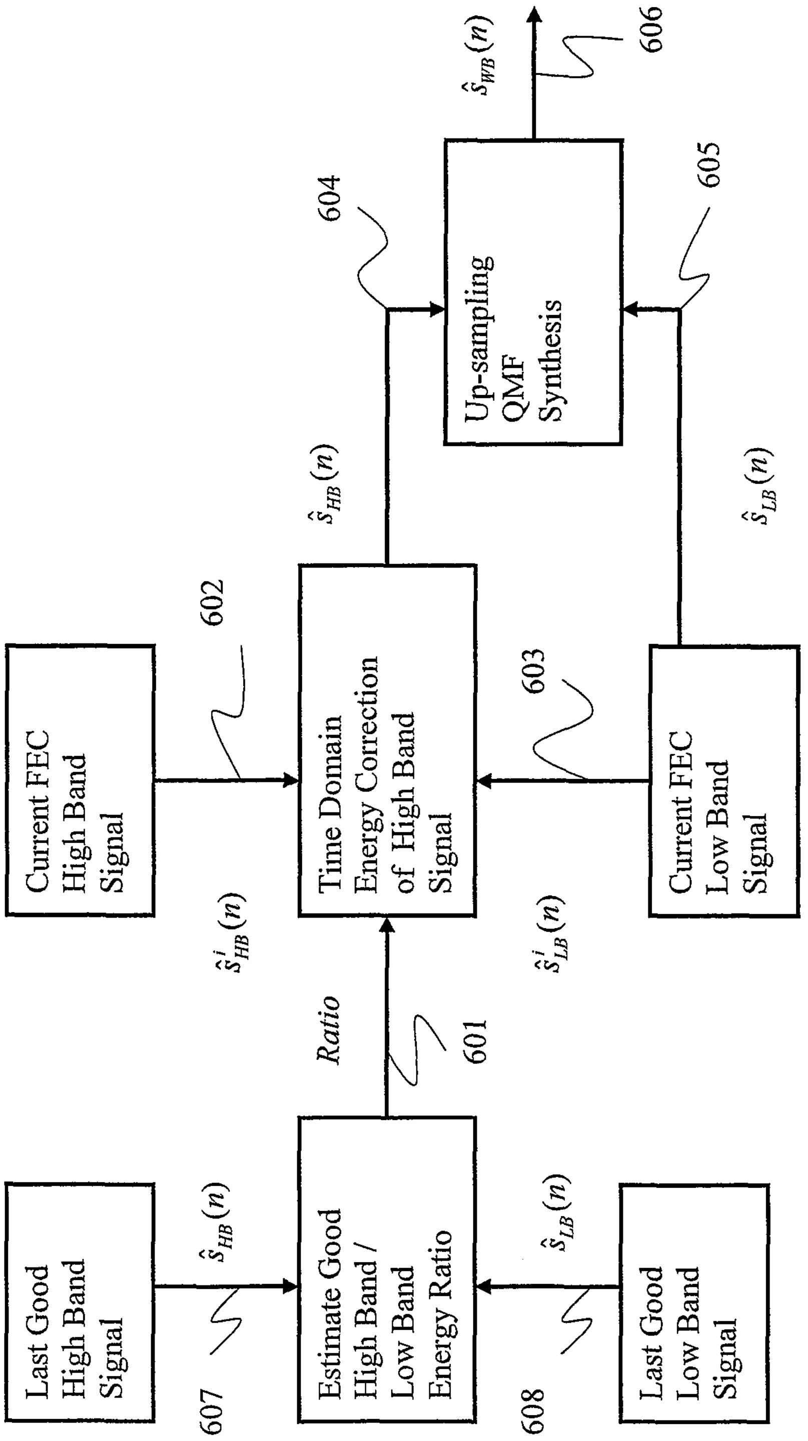
FIG. 6 illustrates a block diagram an embodiment time domain energy correction for FEC.

With respect to time domain control of FEC based on the energy ratio between the high band and the low band, FIG. 6 summarizes an embodiment time domain energy correction in case of FEC. The low band and high band time domain synthesis signals are noted as $\hat{s}_{LB}(n)$ and $\hat{s}_{HB}(n)$ respectively, and are sampled at an 8 kHz sampling rate. In the case of an error free condition, $\hat{s}_{LB}(n)$ is a combination of CELP output and MDCT enhancement layer output: $\hat{s}_{LB}(n)=\hat{s}_{LB}^{celp}(n)+\hat{d}_{LB}^{echo}(n)$, and the MDCT enhancement layer time domain output is the inverse MDCT transformation of $\hat{D}_{LB}^{w}(k)$. In some embodiments, the contribution of the CELP output $\hat{s}_{LB}^{celp}(n)$ is normally dominant, and $\hat{s}_{HB}(n)$ is obtained by performing an inverse MDCT transformation of $\hat{S}_{HB}(k)$. The final output signal sampled at 16 kHz, $\hat{s}_{WB}(n)$, is computed by upsampling both $\hat{s}_{LB}(n)$ and $\hat{s}_{HB}(n)$, and by filtering the upsampled signals with a quadrature mirror filter (QMF) synthesis filter bank.

Because the time domain signal $\hat{s}_{HB}(n)$ is obtained by performing the inverse MDCT transformation of $\hat{S}_{HB}(k)$, $\hat{s}_{HB}(n)$ has just one frame delay compared to the latest received CELP frame or TDBWE frame in time domain, the correct temporal envelope shape for the first FEC frame of $\hat{s}_{HB}(n)$ can be still obtained from the latest received TDBWE parameters. In an embodiment, to evaluate the temporal energy envelope, one 20 ms frame is divided into 8 small sub-segments of 2.5 ms, and the temporal energy envelope noted as $T_{env}(i)$, i=0, 1, . . . 7, represents the energy of each sub-segment. For the first FEC frame of $\hat{s}_{HB}(n)$, $T_{env}(i)$ is obtained by decoding the latest received TDBWE parameters, and the corresponding low band CELP output $\hat{s}_{LB}^{celp}(n)$ is still correct by decoding the latest received CELP parameters. However, the contribution $\hat{d}_{LB}^{echo}(n)$ from the MDCT enhancement layer is only partially correct and is diminished to zero from the first FEC frame to the second FEC frame. Here, CELP encodes/decodes frame by frame, however, MDCT over-lap-adds a moving window of two frames, so that the result of the current frame is the combination of the previous frame and the current frame.

For the second FEC frame of $\hat{s}_{HB}(n)$ and the following FEC frames, the G.729.1 decoder already provides an FEC algorithm to recover the corresponding low band output 605, $\hat{s}_{LB}(n)$. High band signal $\hat{s}_{HB}(n)$ is first estimated by performing an inverse MDCT transform of $\hat{S}_{HB}(k)$ which is expressed in Equation (12). Due to the fact that $\hat{s}_{LB}(n)$ and $\hat{s}_{HB}(n)$ are respectively estimated in different paths with different methods, their relative energy relationship may not be perceptually the best. While this relative energy relationship is important from perceptual point of view, the energy of $\hat{s}_{HB}(n)$ could be too low or too high in the time domain, compared to the energy of $\hat{s}_{LB}(n)$. In an embodiment, one way to address this issue is first to get the energy ratio between 608, $\hat{s}_{LB}(n)$, and 607, $\hat{s}_{HB}(n)$, from the last received frame or the first FEC frame of $\hat{s}_{HB}(n)$, and then keep this energy ratio for the following FEC frames.

In an embodiment, as the inverse MDCT transformation causes one frame delay, an estimation of the energy ratio between the low band signal and the high band signal is calculated during the first FEC frame of $\hat{s}_{HB}(n)$. The low band energy is from the low band signal $\hat{s}_{LB}(n)$ obtained from the G.729.1 decoder, and the high band energy is the sum of the temporal energy envelope $T_{env}(i)$ parameters evaluated from the latest received TDBWE parameters. Energy ratio 601 is defined as $$\text{Ratio} = \frac{E_{HB}}{E_{LB}} = \frac{\sum_i T_{env}(i)}{\|\hat{s}_{LB}(n)\|^2}. \tag{16}$$

Equation (16) represents the average energy ratio for the whole time domain frame.

In an embodiment, for the first FEC frame of $\hat{s}_{HB}(n)$, the temporal energy envelope $T_{env}(i)$ is directly applied by multiplying each high band sub-segment 602, $\hat{s}_{HB}^{i}(j)=\hat{s}_{HB}(20\cdot i+j)$, with a gain factor $g_f(i)$:

$$g_f(i) = 0.9\sqrt{\frac{T_{env}(i)}{\sum_{j=0}^{20}|\hat{s}_{HB}(i\cdot 20+j)|^2}},\ i = 0, 1, \ldots 7. \tag{17}$$

the above gain factor is further smoothed sample by sample during the gain factor multiplication:

$$\overline{g}_f(j) \Leftarrow 0.95\cdot\overline{g}_f(j-1)+0.05\cdot g_f(i);\text{and} \tag{18}$$

$$\hat{s}_{HB}(i\cdot 20+j) \Leftarrow \hat{s}_{HB}(i\cdot 20+j)\cdot\overline{g}_f(j). \tag{19}$$

In equations (17), (18), and (19), i is sub-segment index and j is sample index. It should be noted that in alternative embodiments, the multiplying constant of 0.9 take on other values, more than or less then 20 samples can be used in equation (17). In further embodiments, $\overline{g}_f(j)$ can be expressed generally as $\overline{g}_f(j) \Leftarrow \lambda\cdot\overline{g}_f(j-1)+(1-\lambda)\cdot g_f(i)$, $0\leq\lambda\leq 1$, and $\hat{s}_{HB}(i\cdot L+j) \Leftarrow \hat{s}_{HB}(i\cdot L+j)\cdot\overline{g}_f(j)$, where L is an integer.

In an embodiment, for the second FEC frame of $\hat{s}_{HB}(n)$, and for the following FEC frames, each frame is also divided into 8 small sub-segments. The energy ratio correction is performed on each small sub-segment. The energy correction gain factor $g_i$ for i-th sub-segment is calculated in the following way:

$$g_i = \sqrt{\text{Ratio}\cdot\frac{\|\hat{s}_{LB}^{i}(j)\|^2}{\|\hat{s}_{HB}^{i}(j)\|^2}}\quad \text{if } g_i > 1,\ g_i = 1. \tag{20}$$

In Equation (20), $\|\hat{s}_{LB}^{i}(j)\|^2$ and $\|\hat{s}_{HB}^{i}(j)\|^2$ represent respectively the energies of the i-th sub-segments of the low band signal 603, $\hat{s}_{LB}^{i}(j)=\hat{s}_{LB}(20\cdot i+j)$, and the high band signal 602, $\hat{s}_{HB}^{i}(j)=\hat{s}_{HB}(20\cdot i+j)$. The correction gain defined in equation (20) is finally applied to the i-th sub-segment $\hat{s}_{HB}^{i}(j)$ while smoothing the gain from one segment to next segment, sample by sample:

$$\overline{g}_i(j) \Leftarrow 0.95\cdot\overline{g}_i(j-1)+0.05\cdot g_i;\text{and} \tag{21}$$

$$\hat{s}_{HB}^{i}(j) \Leftarrow \hat{s}_{HB}^{i}(j)\cdot\overline{g}_i(j). \tag{22}$$

In a final step, the energy corrected high band signal 604, $\hat{s}_{HB}(n)$, and the low band signal 605, $\hat{s}_{LB}(n)$, are upsampled and filtered with a QMF filter bank to form the final wideband output signal 606, $\hat{s}_{WB}(n)$. It should be noted that in alternative embodiments, $\overline{g}_i(j)$ can be expressed generally as $$\overline{g}_i(j) \Leftarrow \lambda_2\cdot\overline{g}_i(j-1)+(1-\lambda_2)\cdot g_i,\ 0\leq\lambda_2\leq 1,\text{ and}$$

$$\hat{s}_{HB}(i\cdot L_2+j) \Leftarrow \hat{s}_{HB}(i\cdot L_2+j)\cdot\overline{g}_i(j).$$

where $L_2$ is an integer; normally, $\lambda_2=\lambda$ and $L_2=L$, however, in some embodiments, $\lambda_2\neq\lambda$ and/or $L_2\neq L$.

Figure 7:
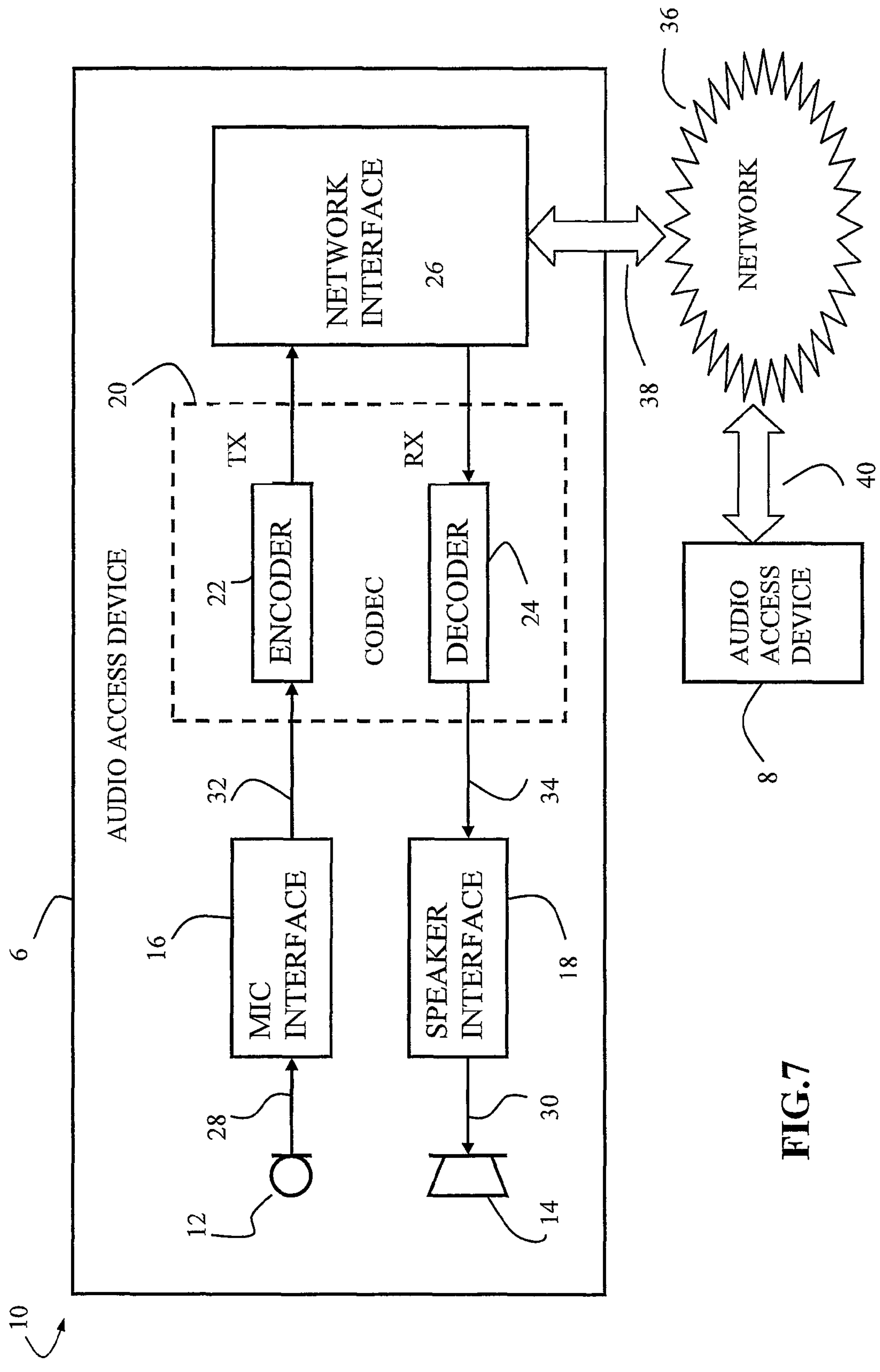
FIG. 7 illustrates an embodiment communication system.

FIG. 7 illustrates communication system 10 according to an embodiment of the present invention. Communication system 10 has audio access devices 6 and 8 coupled to network 36 via communication links 38 and 40. In one embodiment, audio access device 6 and 8 are voice over internet protocol (VOIP) devices and network 36 is a wide area network (WAN), public switched telephone network (PSTN) and/or the internet. Communication links 38 and 40 are wireline and/or wireless broadband connections. In an alternative embodiment, audio access devices 6 and 8 are cellular or mobile telephones, links 38 and 40 are wireless mobile telephone channels and network 36 represents a mobile telephone network.

Audio access device 6 uses microphone 12 to convert sound, such as music or a person's voice into analog audio input signal 28. Microphone interface 16 converts analog audio input signal 28 into digital audio signal 32 for input into encoder 22 of CODEC 20. Encoder 22 produces encoded audio signal TX for transmission to network 26 via network interface 26 according to embodiments of the present invention. Decoder 24 within CODEC 20 receives encoded audio signal RX from network 36 via network interface 26, and converts encoded audio signal RX into digital audio signal 34. Speaker interface 18 converts digital audio signal 34 into audio signal 30 suitable for driving loudspeaker 14.

In embodiments of the present invention, where audio access device 6 is a VOIP device, some or all of the components within audio access device 6 are implemented within a handset. In some embodiments, however, Microphone 12 and loudspeaker 14 are separate units, and microphone interface 16, speaker interface 18, CODEC 20 and network interface 26 are implemented within a personal computer. CODEC 20 can be implemented in either software running on a computer or a dedicated processor, or by dedicated hardware, for example, on an application specific integrated circuit (ASIC). Microphone interface 16 is implemented by an analog-to-digital (A/D) converter, as well as other interface circuitry located within the handset and/or within the computer. Likewise, speaker interface 18 is implemented by a digital-to-analog converter and other interface circuitry located within the handset and/or within the computer. In further embodiments, audio access device 6 can be implemented and partitioned in other ways known in the art.

In embodiments of the present invention where audio access device 6 is a cellular or mobile telephone, the elements within audio access device 6 are implemented within a cellular handset. CODEC 20 is implemented by software running on a processor within the handset or by dedicated hardware. In further embodiments of the present invention, audio access device may be implemented in other devices such as peer-to-peer wireline and wireless digital communication systems, such as intercoms, and radio handsets. In applications such as consumer audio devices, audio access device may contain a CODEC with only encoder 22 or decoder 24, for example, in a digital microphone system or music playback device. In other embodiments of the present invention, CODEC 20 can be used without microphone 12 and speaker 14, for example, in cellular base stations that access the PTSN.

In some embodiments of the present invention, embodiment algorithms are implemented by CODEC 20. In further embodiments, however, embodiment algorithms can be implemented using general purpose processors, application specific integrated circuits, general purpose integrated circuits, or a computer running software.

In an embodiment, a method of receiving an audio signal using a low complexity and high quality FEC or PLC includes copying frequency domain coefficients from previous frame, adaptively adding random noise to the copied coefficients, scaling the random noise component and the copied component, wherein the scaling is controlled with a parameter representing the periodicity or harmonicity of the audio. In an embodiment, the frequency domain can be represented, for example in the MDCT, DFT, or FFT domain. In further embodiments, discrete frequency domains can be used. In an embodiment, the parameter representing the periodicity or harmonicity can be a voicing factor, pitch gain, or spectral sharpness variable.

In an embodiment the recovered frequency domain (MDCT domain) coefficients are expressed as, $$\hat{S}_{HB}(k)=g_1\cdot\hat{S}_{HB}^{old}(k)+g_2\cdot N(k),$$

where $\hat{S}_{HB}^{old}(k)$ are copied MDCT coefficients from previous frame; N(k) are random noise coefficients, the energy of which is initially normalized to $\hat{S}_{HB}^{old}(k)$ in each subband, and g1 and g2 are adaptive controlling gains.

In a further embodiment, $g_1$ and $g_2$ are defined as:

$$g_1=g_r\cdot\overline{G}_p, \text{ and}$$

$$g_2=g_r\cdot(1-\overline{G}_p),$$

where $g_r$=0.9 is a gain reduction factor in MDCT domain to maintain the energy of current frame lower than the one of previous frame, $\overline{G}_p$ is the last smoothed voicing factor which represents the periodicity or harmonicity, and $\overline{G}_p$ is smoothed as $\overline{G}_p \Leftarrow 0.75\,\overline{G}_p+0.25\,G_p$ from one received subframe to next received subframe. During FEC frames, $\overline{G}_p$ is reduced by a factor 0.75 from current to next frame: $\overline{G}_p \Leftarrow 0.75\,\overline{G}_p$ so that the periodicity keeps decreasing when more consecutive FEC frames occur.

In an embodiment, $G_p$ has the definition from received subframe:

$$G_p=\frac{E_p}{E_p+E_c},$$

where $E_p$ is the energy of the CELP adaptive codebook excitation component and $E_c$ is the energy of the CELP fixed codebook excitation component.

In some embodiments, wherein $G_p$ can be replaced by a pitch gain or a normalized pitch gain:

$$g_p=\frac{\sum_n \hat{s}(n)\cdot\hat{s}(n+T)}{\sqrt{\left[\sum_n \hat{s}(n)\cdot\hat{s}(n)\right]\left[\sum_n \hat{s}(n+T)\cdot\hat{s}(n+T)\right]}},$$

where T is a pitch lag from last received frame for CELP algorithm, ŝ(n) is time domain signal which sometimes can be defined in weighted signal domain or LPC residual domain.

In other embodiments, wherein $G_p$ can be replaced by the spectral sharpness defined as the average frequency magnitude divided by the maximum frequency magnitude:

$$\text{Sharp}=\frac{\frac{1}{N}\sum_k\left|\hat{S}_{HB}(k)\right|}{\text{Max}\left\{\left|\hat{S}_{HB}(k)\right|,\ k=0,1,\ldots,N\right\}}.$$

In an embodiment, a method of low complexity and high quality FEC or PLC includes generating high band time domain signal, generating low band time domain signal, estimating the energy ratio between the high band and the low band from last good frame, keeping the energy ratio for the following frame-erased frames by applying an energy correction scaling gain to the high band signal segment by segment in time domain, and combining the low band signal and the high band signal into the final output. In some embodiments, the scaling gain is smoothed sample by sample from one segment to next of the high band signal.

In an embodiment, the energy ratio from last good frame is calculated as $$\text{Ratio} = \frac{E_{HB}}{E_{LB}} = \frac{\sum_i T_{env}(i)}{\|\hat{s}_{LB}(n)\|^2},$$

where $T_{env}(i)$ is the temporal energy envelope of the last good high band signal.

In an embodiment, wherein the energy correction gain factor $g_i$ for i-th sub-segment of the following erased frames is calculated in the following way:

$$g_i = \sqrt{\text{Ratio} \cdot \frac{\|\hat{s}^i_{LB}(j)\|^2}{\|\hat{s}^i_{HB}(j)\|^2}} \quad \text{if } g_i > 1,\ g_i = 1$$

where $\|\hat{s}_{LB}{}^i(j)\|^2$ and $\|\hat{s}_{HB}{}^i(j)\|^2$ represent respectively the energies of the i-th sub-segments of the low band signal $\hat{s}_{LB}{}^i(j)=\hat{s}_{LB}(20\cdot i+j)$ and the high band signal $\hat{s}_{HB}{}^i(j)=\hat{s}_{HB}(20\cdot i+j)$.

In an embodiment, the correction gain factor $g_i$ is finally applied to the i-th sub-segment high band signal $\hat{s}_{HB}{}^i(j)=\hat{s}_{HB}(20\cdot i+j)$, while smoothing the gain from one segment to next segment, sample by sample:

$$\bar{g}_i(j) \Leftarrow 0.95\cdot\bar{g}_i(j-1)+0.05\cdot g_i$$

$$\hat{s}_{HB}{}^i(j) \Leftarrow \hat{s}_{HB}{}^i(j)\cdot\bar{g}_i(j).$$

In an embodiment, a method of low complexity and high quality FEC or PLC includes copying high band frequency domain coefficients from previous frame, adaptively adding random noise to the copied coefficients, scaling the random noise component and the copied component, controlled with a parameter representing said periodicity or harmonicity of said signal, generating high band time domain signal by inverse-transforming the generated high band frequency domain coefficients, generating low band time domain signal, estimating the energy ratio between the high band and the low band from last good frame, keeping the energy ratio for the following frame-erased frames by applying an energy correction scaling gain to the high band signal segment by segment in time domain, and combining the low band signal and the high band signal into the final output. In some embodiments, the frequency domain can be MDCT domain, DFT (FFT) domain, or any other discrete frequency domain. In some embodiments, the parameter representing the periodicity or harmonicity can be voicing factor, pitch gain, or spectral sharpness.

In some embodiments, the method is applied to operate for systems configured to operate over a voice over internet protocol (VOIP) system, or for systems that operate over a cellular telephone network. In some embodiments, the method is applied to operate within a receiver having an audio decoder configured to receive the audio parameters and produce an output audio signal based on the received audio parameters, wherein the output audio signal comprises an improved FEC signals.

In embodiment, a MDCT based FEC algorithm replaces the TDBWE based FEC algorithm for Layers 4 to 12 in a G.729EV based system.

In a further embodiment, a method of correcting for missing data of a digital audio signal includes copying frequency domain coefficients of the digital audio signal from a previous frame, adaptively adding random noise coefficients to the copied frequency domain coefficients, scaling the random noise coefficients and the copied frequency domain coefficients to form recovered frequency domain coefficients. Scaling is controlled with a parameter representing a periodicity or harmonicity of the digital audio signal. The method also includes generating a high band time domain signal by inverse-transforming high band frequency domain coefficients of the recovered frequency domain coefficients, generating low band time domain signal by a corresponding to low band coding method and estimating an energy ratio between the high band and the low band from a last good frame. The method further includes keeping the energy ratio for following frame-erased frames by applying an energy correction scaling gain to a high band signal, segment by segment in the time domain and combining the low band signal and the high band signal to form a final output.

In a further embodiment, a system for receiving a digital audio signal includes an audio decoder configured to copy frequency domain coefficients of the digital audio signal from a previous frame, adaptively add random noise coefficients to the copied coefficients, and scale the random noise coefficients and the copied frequency domain coefficients to form recovered frequency domain coefficients. In an embodiment, scaling is controlled with a parameter representing a periodicity or harmonicity of the digital audio signal. The audio decoder is further configured to produce a corrected audio signal from the recovered frequency domain coefficients.

In an embodiment, wherein the audio decoder is further configured to receive audio parameters from the digital audio signal. In an embodiment, the audio decoder is implemented within a voice over internet protocol (VOIP) system. In one embodiment, the system further includes a loudspeaker coupled to the corrected audio signal.

It should be appreciated that in alternate embodiments, different sample rates and numbers of channels that are different from the specific examples disclosed hereinabove can be used. Furthermore, embodiment algorithms can be used to correct for lost data in a variety of systems and contexts.

Advantages of embodiment algorithms include an ability to achieve a simpler FEC algorithm for those layers higher than 14 kbps in G.729.1 SWB by exploiting characteristics of MDCT based codec algorithms.

The above description contains specific information pertaining to low complexity FEC algorithm for MDCT Based Codec. However, one skilled in the art will recognize that embodiments of the present invention may be practiced in conjunction with various encoding/decoding algorithms different from those specifically discussed in the present application. Moreover, some of the specific details, which are within the knowledge of a person of ordinary skill in the art, are not discussed to avoid obscuring the present invention.

The drawings in the present application and their accompanying detailed description are directed to merely example embodiments of the invention. To maintain brevity, other embodiments of the invention that use the principles of the present invention are not specifically described in the present application and are not specifically illustrated by the present drawings.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A method of receiving a digital audio signal, using a processor, the method comprising correcting the digital audio signal from lost data, correcting comprising:

copying frequency domain coefficients of the digital audio signal from a previous frame;

adaptively adding random noise coefficients to the copied frequency domain coefficients;

scaling the random noise coefficients and the copied frequency domain coefficients to form recovered frequency domain coefficients, wherein scaling is controlled with a parameter representing a periodicity or harmonicity of the digital audio signal, and wherein the scaling affects a ratio between an amplitude of the copied frequency domain coefficients and an amplitude of the random noise coefficients; and producing a corrected audio signal from the recovered frequency domain coefficients.

2. The method of claim 1, wherein the frequency domain coefficients comprise MDCT domain coefficients or FFT domain coefficients.

3. The method of claim 1, wherein the parameter representing the periodicity or harmonicity comprises a voicing factor, a pitch gain, or a spectral sharpness.

4. A method of receiving a digital audio signal, using a processor, the method comprising correcting the digital audio signal from lost data, correcting comprising:

copying frequency domain coefficients of the digital audio signal from a previous frame;

adaptively adding random noise coefficients to the copied frequency domain coefficients;

scaling the random noise coefficients and the copied frequency domain coefficients to form recovered frequency domain coefficients, wherein scaling is controlled with a parameter representing a periodicity or harmonicity of the digital audio signal; and producing a corrected audio signal from the recovered frequency domain coefficients, wherein the recovered frequency domain coefficients are defined as:

$$\hat{S}_{HB}(k)=g_1\cdot\hat{S}_{HB}^{old}(k)+g_2\cdot N(k),$$

where $\hat{S}_{HB}^{old}(k)$ are the copied frequency domain coefficients, N(k) are random noise coefficients, an energy of which is initially normalized to $\hat{S}_{HB}^{old}(k)$ in each subband, and $g_1$ and $g_2$ are adaptive controlling gains.

5. The method of claim 4, wherein $g_1$ and $g_2$ are defined as:

$$g_1=g_r\cdot\overline{G}_p, \text{ and}$$

$$g_2=g_r\cdot(1-\overline{G}_p),$$

wherein:

$g_r$ is a gain reduction factor used to maintain the energy of a current frame lower than the one of a previous frame, $\overline{G}_p$ is a last smoothed voicing factor that represents the periodicity or harmonicity, $\overline{G}_p$ is smoothed as $\overline{G}_p \Leftarrow \beta\overline{G}_p+(1-\beta)G_p$, where β is between 0 and 1, from one received subframe to a next received subframe, the ⇐ operator is an assignment operator, and $G_p$ is a last received voicing parameter.

6. The method of claim 5, wherein $g_r$ is about 0.9, and β is about 0.75.

7. The method of claim 5, wherein $G_p$ is defined as:

$$G_p=\frac{E_p}{E_p+E_c}$$

where $E_p$ is an energy of a CELP adaptive codebook excitation component from a received subframe, and $E_c$ is an energy of the CELP fixed codebook excitation component of the received subframe.

8. The method of claim 5, wherein $G_p$ is replaced by a pitch gain or a normalized pitch gain defined as:

$$g_p=\frac{\sum_n \hat{s}(n)\cdot\hat{s}(n+T)}{\sqrt{\left[\sum_n \hat{s}(n)\cdot\hat{s}(n)\right]\left[\sum_n \hat{s}(n+T)\cdot\hat{s}(n+T)\right]}},$$

where T is a pitch lag from a last received frame for a CELP algorithm, ŝ(n) is time domain signal defined in weighted signal domain or LPC residual domain, and n represents a digital domain time.

9. The method of claim 5, wherein $G_p$ is replaced by a spectral sharpness defined as an average frequency magnitude divided by a maximum frequency magnitude:

$$\text{Sharp}=\frac{\frac{1}{N}\sum_k \left|\hat{S}_{HB}(k)\right|}{\text{Max}\{\left|\hat{S}_{HB}(k)\right|, k=0, 1, \ldots, N\}}.$$

10. A system for receiving a digital audio signal, the system comprising:

a processor; and a computer readable storage medium storing programming for execution by the processor, the programming including instructions to copy frequency domain coefficients of the digital audio signal from a previous frame, adaptively add random noise coefficients to the copied frequency domain coefficients, scale the random noise coefficients and the copied frequency domain coefficients to form recovered frequency domain coefficients, wherein scaling is controlled with a parameter representing a periodicity or harmonicity of the digital audio signal, and wherein the scaling affects a ratio between an amplitude of the copied frequency domain coefficients and an amplitude of the random noise coefficients, and produce a corrected audio signal from the recovered frequency domain coefficients.

11. The system of claim 10, wherein the frequency domain coefficients comprise MDCT domain coefficients or FFT domain coefficients.

12. The system of claim 10, wherein the parameter representing the periodicity or harmonicity comprises a voicing factor, a pitch gain, or a spectral sharpness.

13. A system for receiving a digital audio signal, the system comprising:

a processor; and a computer readable storage medium storing programming for execution by the processor, the programming including instructions to copy frequency domain coefficients of the digital audio signal from a previous frame, adaptively add random noise coefficients to the copied frequency domain coefficients, scale the random noise coefficients and the copied frequency domain coefficients to form recovered frequency domain coefficients, wherein scaling is controlled with a parameter representing a periodicity or harmonicity of the digital audio signal, and produce a corrected audio signal from the recovered frequency domain coefficients, wherein the recovered frequency domain coefficients are defined as:

$$\hat{S}_{HB}(k)=g_1\cdot\hat{S}_{HB}^{old}(k)+g_2\cdot N(k),$$

where $\hat{S}_{HB}^{old}(k)$ are the copied frequency domain coefficients, N(k) are random noise coefficients, an energy of which is initially normalized to $\hat{S}_{HB}^{old}(k)$ in each subband, and $g_1$ and $g_2$ are adaptive controlling gains.

14. The system of claim 13, wherein $g_1$ and $g_2$ are defined as:

$$g_1=g_r\cdot\overline{G}_p, \text{ and}$$

$$g_2=g_r\cdot(1-\overline{G}_p),$$

wherein:

$g_r$ is a gain reduction factor used to maintain the energy of a current frame lower than the one of a previous frame, $\overline{G}_p$ is a last smoothed voicing factor that represents the periodicity or harmonicity, $\overline{G}_p$ is smoothed as $\overline{G}_p \Leftarrow \beta\overline{G}_p+(1-\beta)G_p$, where β is between 0 and 1, from one received subframe to a next received subframe, the ⇐ operator is an assignment operator, and $G_p$ is a last received voicing parameter.

15. The system of claim 14, wherein $g_r$ is about 0.9, and β is about 0.75.

16. The system of claim 14, wherein $G_p$ is defined as:

$$G_p=\frac{E_p}{E_p+E_c}$$

where $E_p$ is an energy of a CELP adaptive codebook excitation component from a received subframe, and $E_c$ is an energy of the CELP fixed codebook excitation component of the received subframe.

17. The system of claim 14, wherein $G_p$ is replaced by a pitch gain or a normalized pitch gain defined as:

$$g_p=\frac{\sum_n \hat{s}(n)\cdot\hat{s}(n+T)}{\sqrt{\left[\sum_n \hat{s}(n)\cdot\hat{s}(n)\right]\left[\sum_n \hat{s}(n+T)\cdot\hat{s}(n+T)\right]}},$$

where T is a pitch lag from a last received frame for a CELP algorithm, ŝ(n) is time domain signal defined in weighted signal domain or LPC residual domain, and n represents a digital domain time.

18. The system of claim 14, wherein $G_p$ is replaced by a spectral sharpness defined as an average frequency magnitude divided by a maximum frequency magnitude:

$$\text{Sharp}=\frac{\frac{1}{N}\sum_k\left|\hat{S}_{HB}(k)\right|}{\text{Max}\left\{\left|\hat{S}_{HB}(k)\right|, k=0, 1, \ldots, N\right\}}.$$

19. A system for receiving a digital audio signal, the system comprising:

a receiver comprising an audio decoder, wherein the audio decoder is configured to:

copy frequency domain coefficients of the digital audio signal from a previous frame, adaptively add random noise coefficients to the copied frequency domain coefficients, scale the random noise coefficients and the copied frequency domain coefficients to form recovered frequency domain coefficients, wherein scaling is controlled with a parameter representing a periodicity or harmonicity of the digital audio signal, and wherein the scaling affects a ratio between an amplitude of the copied frequency domain coefficients and an amplitude of the random noise coefficients, and produce a corrected audio signal from the recovered frequency domain coefficients.

20. The system of claim 19, wherein the parameter representing the periodicity or harmonicity comprises a voicing factor, a pitch gain, or a spectral sharpness.

* * * * *